Dec. 20, 1955
W. F. JENKINS
2,727,429
APPARATUS FOR THE PRODUCTION OF
COMPOSITE PHOTOGRAPHIC EFFECTS
Filed Nov. 30, 1953
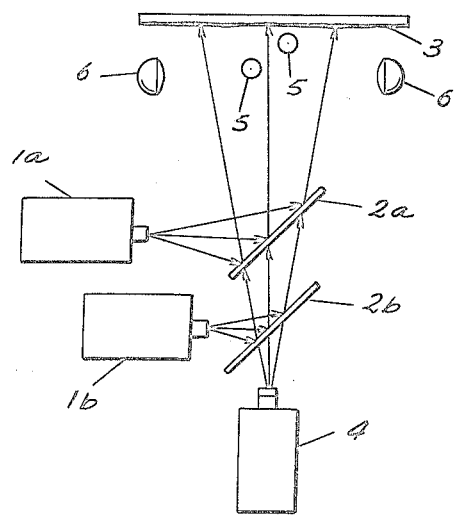
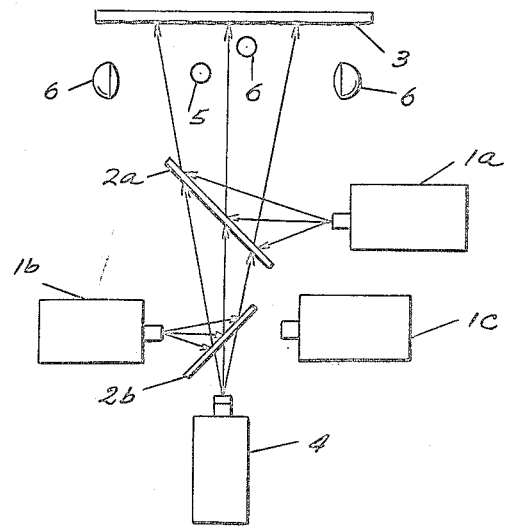
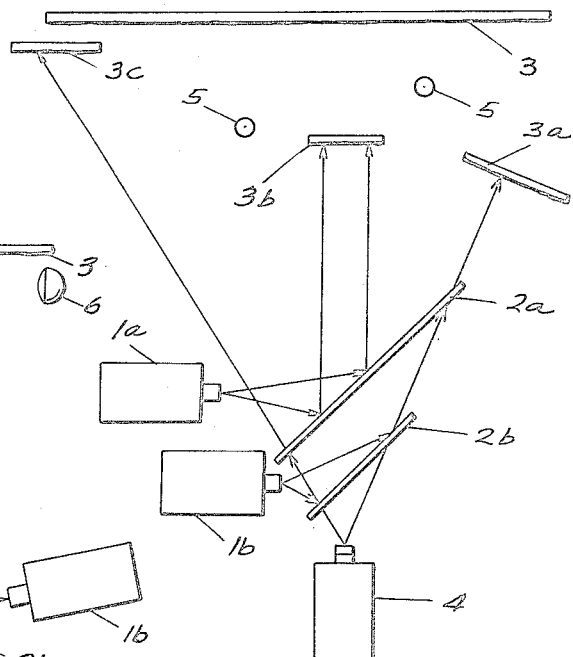
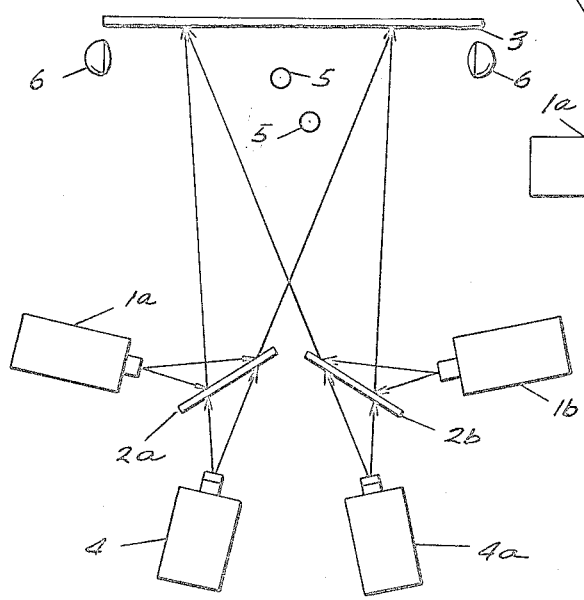
INVENTOR.
WILL F. JENKINS
BY
ATTORNEYS United States Patent Office 2,727,429
Patented Dec. 20, 1955

2,727,429

APPARATUS FOR THE PRODUCTION OF COMPOSITE PHOTOGRAPHIC EFFECTS

Will F. Jenkins, Gloucester, Va.

Application November 30, 1953, Serial No. 395,043

3 Claims. (Cl. 88—16)

This application is a continuation-in-part of my application Serial No. 274,638, filed March 3, 1952.

This invention relates to apparatus for the production of composite photographic effects. More particularly it relates to apparatus whereby realistic scenes may be photographically recorded in which the building, handling, and maintenance of stage scenery may be largely dispensed with.

The handling of scenery has always been a major problem in the staging of any kind of show. The advent of television made the problem even worse since live scenes cannot be repeated and corrected. Furthermore split second timing is often necessary in staging a quarter hour or half hour television show, hence the cost of handling scenery can be enormous. The advertiser pays the cost of the show, but the high cost of television production has made the medium too expensive for many advertisers. Reduction or elimination of constructive scenery has up to now lowered the quality of the show. Thus the progress of television broadcasting has been seriously impeded.

It is an object of this invention to provide apparatus for the simplified, cheap and efficient, production of still pictures, and of motion picture or television performances. It is a further object to provide apparatus whereby unusual effects may be readily and cheaply produced on motion picture or television sets.

These objects are obtained in a surprisingly simple and efficient manner. The apparatus of the invention includes at least one back-drop having a surface covered with a reflex reflecting surface. The staging of the show takes place on the acting-set in front of this backdrop. One or more cameras for recording the performance are located at a convenient place in front of the backdrop so that the lens of the camera takes in the action on the acting-set. Two or more sheets of plane transparent material are positioned at spaced intervals in front of the camera lens or lenses or between the camera and backdrop. Two projectors or more are so located that their light first strikes the plane transparent sheets; the light from each projector first strikes a single plane transparent sheet. A portion of the light from each projector is thus reflected to the reflex reflecting surface that serves as a backdrop. The relative positions of the camera or cameras, the projectors, and the plane transparent sheets are so adjusted that the lens of the camera or cameras receive both the reflected light from the projectors and the light from the scene being enacted.

In the accompanying illustrative drawings:

Fig. 1 is a simplified diagrammatic representation of a stage showing a single camera with two projectors and two plane transparent sheets in operation;

Fig. 2 shows an alternate arrangement of the apparatus in Fig. 1, and in addition shows how additional projectors may be incorporated into the apparatus;

Fig. 3 shows two cameras in operation with two projectors and two plane transparent sheets; and Fig. 4 shows an arrangement utilizing a plurality of backdrops.

Referring to Fig. 1 two projectors are shown at 1a and 1b. The light from projector 1a strikes plane transparent sheet 2a, while light from projector 1b strikes plane transparent sheet 2b. A portion of the light from the projectors striking the plane transparent sheets passes on through the sheets and is unused here. The remaining portion of the projectors light however is reflected from the plane transparent sheets to the backdrop or reflecting structure 3 which has an extended reflecting surface facing the camera 4. The reflecting surface of the reflecting structure 3 is a reflex reflecting surface of the type described in connection with Fig. 4 of my co-pending application Ser. No. 274,638, filed March 3, 1952. Such reflex reflecting surfaces having been long known to the art, having been described for instance in Palmquist Patents Nos. 2,294,930 and 2,379,741. In such reflex reflector screens, an outer layer of adjacent transparent bead or sphere-like lens elements with underlying light reflecting elements which are in optical connection therewith cause beams of light incident on the outer layer to be refracted and reflected as brilliant cones of light in a direction generally coaxial with the incident light beams throughout the range of angular relations of the layer surface and the direction of the incident light between 90° and about 50°. Any of the reflex reflector screens operative in the manner described above may be used for the reflector surface of the reflector structure 3 of the systems of the invention shown in the drawing, including the similar reflex reflector screens shown in Figs. 2, 3 and 4, at 3, 3a, 3b and 3c.

The light from the backdrop 3 is reflected to the two plane transparent sheets 2a and 2b. A portion of this reflected light passes through the plane transparent sheets and is recorded by the camera 4 which can be a still camera, a motion picture camera, or a television camera. The camera 4 will not record the light from the projectors that strikes the actors 5. The actors 5 are diffuse reflectors as far as the camera 4 is concerned and extra side lighting 6 masks the projector's light. Hence any images thrown by the projectors do not show up on the actors 5.

Fig. 2 illustrates another way to set up the apparatus of Fig. 1. In Fig. 2 projector 1a is located on the other side of the camera 4 from projector 1b. Such an arrangement in no way changes the operation of the apparatus as shown in Fig. 1. The sheets 2a and 2b, the projector 1b, the backdrop with the reflex reflecting surface 3 and the actors 5 all function as before. Fig. 2 also shows how a third projector 1c may be brought into use. In Fig. 2 as shown projectors 1a and 1b are each throwing images to the backdrop 3. Projector 1c is capped. In order to cut out projector 1b and cut in projector 1c the plane transparent sheet 2b is revolved 90° on its vertical axis so that it is parallel to plane transparent sheet 2a. At the same time projector 1c is uncapped and projector 1b is capped. By this method each plane transparent sheet may utilize a pair of projectors, one located on each side of the sheet, and adapted to alternatively throw an image to the backdrop 3. It must be pointed out that the location of the projectors is not critical. They may be located above or below the plane transparent sheets. It is only necessary that the light from each projector impinge on the plane transparent sheet and then be reflected to the reflex surface on the backdrop. In order for the camera to see a useable image on the reflex reflecting screen the projector's light must be focused on the screen. The camera should be located so that the light path from the backdrop to the camera lens is approximately the same length as the light path from the projector lens to the backdrop via the plane transparent sheet; the camera should be same optical distance from the screen as the projector.

The use of two projectors with one camera as shown in Fig. 1 allows the production of some interesting effects. The background scenery may be easily changed while the actors continue a scene. Changes are made by turning on one projector or uncapping its lens at the same time that the other projector is turned off or capped. If the change is slow it amounts to a fade. If it is abrupt it is a dissolve. Much laboratory processing is eliminated in this way. Many effects impossible in the laboratory may now become possible, for instance, as fading a character from one scene into another, making montages of sequential backgrounds while the actors move uninterruptedly. One or both of the projectors can be a motion picture projector. By masking part of one slide in one projector and a corresponding other part of the other slide in the other projector parts of two projections can be combined into one. For example one projector may show a still slide of the interior of a room with a window. A slide in the other projector can then fill in the exterior view. Thus it is possible to use a slide of a room interior with a summer scene through the window, and later to use the same slide with a winter scene visible through the window. If the projector showing the exterior scene is a motion picture projector it is possible to show trees blowing about, waves in motion or such matter as automobiles passing by. By combinations of the scenes from both projectors it is also possible to show such scenes as a river flowing through the Sahara Desert.

The projectors may be adapted so that the slide being used in the projector moves according to the turning of the camera. The slide will move laterally in the projector. With this ararngement the projected image seems to stay fixed while the camera pans.

Fig. 3 illustrates a modification of the apparatus wherein two or more projectors may be used each with its corresponding plane transparent sheet in conjunction with two or more cameras. The great significance of this modification is that the same backdrop serves two or more of the projector-sheet-camera systems. The reflex reflecting characteristics of the backdrop are such that the light from each projector is returned to its point of origin with a minimum of straying. Thus in Fig. 3, camera 4 and camera 4a may each record action of the actors 5 set against a different background and the light from projector 1a will not interfere with camera 4a and the light from projector 1b will not interfere with camera 4. When the cameras are equipped with proper filters, and are properly spaced, this arrangement can be used to produce 3-dimensional shows.

The apparatus of the present invention is such that the camera-screen-projector system need not remain fixed in position. The system may move in toward the actors for close-ups and it may back off for long shots. It may also move to one side for angle shots. As the system moves both the camera and the projectors are kept in focus by means well known in the art. As mentioned earlier the slide in a projector may be moved laterally so that the camera sees the actors in a changing position relative to the background. The entire system may be mounted on a dolly for ease of movement. When the modification as shown in Fig. 3 is used each of the systems preferably would be mounted on its individual dolly.

Although the drawings show only two plane transparent sheets with their accompanying projectors it is entirely feasible to use 3, 4 or more plane transparent sheets each with its own projector. The intensity of a projector's light may be increased should it become necessary for the light from that projector to pass through a whole series of plane transparent sheets as it returns from the backdrop to the camera.

Fig. 4 illustrates an arrangement with a plurality of backdrops. The reflex surfaces can be used not only as the backdrop 3, but anywhere on the acting-set as illustrated by backdrops 3a, 3b, and 3c. Part of the scenery may be projected on backdrop 3, but another part may be projected on backdrop 3a in the middle ground, and a third part on backdrop 3b in the foreground. The necessary depth of focus for sharp projection can be had by special lens design or by stopping down the projector aperture. Or the image from any one projector may be confined to any one backdrop. With backdrops like 3a, 3b, and 3c, in use, an actor as seen by the camera actually disappears behind the piece of scenery depicted by the projected image. Various props and microphones may be concealed behind any of the additional backdrops. The backdrops themselves are invisible to the cameras since they merely appear as a piece of scenery; an object behind them will be invisible too. It is not necessary that the additional backdrops be parallel to the main backdrop 3. They may be at any angle as illustrated by backdrop 3a.

The main backdrop 3 or any of the backdrops need not be in the form of a plane surface. As seen by the camera they may be concave or convex or irregular. The reflex properties of the surface of the backdrops return incident light to its source whether or not the path of the incident light is normal to the surface of the backdrop.

I claim:

1. In a photographic arrangement for photographing a performance on acting-set elements situated in the front of a background, at least one background structure having an extended reflecting surface, at least two photographic cameras each having its optical axis crossing said reflecting surface and so positioned that the angle between the optical axis of one camera and said reflecting surface is different from the corresponding angle between the optical axis of the other camera and said reflecting surface and as to record both an image focused on said reflecting surface and a performance on an acting-set situated between said reflecting surface and said camera lens, the exterior of said reflecting surface directly facing said cameras having a light returning layer of adjacent transparent minute lens elements and underlying light reflecting elements in optical connection with said elements for causing beams of light incident on said reflecting surface from the region facing said reflecting surface to be refracted and reflected as brilliant cones of light in a direction generally coaxial with said beams, at least one plane transparent mirror body extending with its plane at an angle to the optical axis of one of said cameras between said one camera and said reflecting surface for reflecting incident light received from a lateral direction transverse to said one axis toward said reflecting surface and thereby causing said so reflected incident light to be in turn reflected as brilliant cones of light towards said one camera, at least one image projector for said one mirror body so positioned relatively thereto that the projector's light impinges on said one mirror body from said lateral direction and is focused thereby on said reflecting surface for causing said reflecting surface to return the projector's light as brilliant cones of light in the direction generally parallel to said one optical axis towards said one camera throughout the angular positions of said one camera to said reflecting surface ranging between 90° and at least 60°, and a further similar mirror body and similar image projector similarly positioned relatively to said other camera for causing the light from said further projector to be returned by said reflecting surface as brilliant cones of light in a direction generally parallel to the other optical axis toward said other camera, the angles between said reflecting surface and said two optical axes being sufficiently different as to cause one camera to record an image projected on said reflecting surface by one of said projectors and the other camera to record an image projected on said reflecting surface by said further projector.

2. In a photographic arrangement as claimed in claim 1, said one camera and its associated mirror body and image projector having a movable common supporting structure constituting therewith one camera set movable as a unit to different photographing positions relatively to said reflecting screen.

3. In a photographic arrangement as claimed in claim 1, said one camera and its associated mirror body and image projector having a movable common supporting structure constituting therewith one camera set movable as a unit to different photographing positions relatively to said reflecting screen, said other camera and its associated mirror body and image projecting having another movable common supporting structure constituting therewith a further camera set movable as a unit to digerent photographing positions relatively to said reflecting surface.

References Cited in the file of this patent

UNITED STATES PATENTS

| | | |
|---|---|---|
| 1,301,538 | Brainerd | Apr. 22, 1919 |
| 1,526,715 | Moon et al. | Feb. 17, 1925 |
| 1,959,498 | Planskoy | May 22, 1934 |
| 1,998,054 | McBurney | Apr. 16, 1935 |
| 2,076,103 | Thorner | Apr. 6, 1937 |
| 2,174,931 | Terry et al. | Oct. 3, 1939 |

FOREIGN PATENTS

| | | |
|---|---|---|
| 598,712 | Germany | June 18, 1934 |
| 475,312 | Great Britain | Nov. 17, 1937 |
| 985,945 | France | Mar. 21, 1951 |
| 55,912 | France | June 4, 1952 |

(1st Addition to No. 985,945)